(12) United States Patent
Shannon et al.

(10) Patent No.: US 6,365,667 B1
(45) Date of Patent: Apr. 2, 2002

(54) SYNTHETIC POLYMERS HAVING HYDROGEN BONDING CAPABILITY AND CONTAINING ALIPHATIC HYDROCARBON MOIETIES

(75) Inventors: Thomas Gerard Shannon, Neenah; Daniel Arthur Clarahan, Greenleaf; Mike Thomas Goulet; Wen Zyo Schroeder, both of Appleton, all of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/642,346

(22) Filed: Aug. 21, 2000

Related U.S. Application Data

(62) Division of application No. 09/299,977, filed on Apr. 27, 1999, now Pat. No. 6,274,667.
(60) Provisional application No. 60/117,167, filed on Jan. 25, 1999.

(51) Int. Cl.[7] .............................. C08J 3/03; C08L 33/00; D21H 3/44
(52) U.S. Cl. .................. 524/555; 524/815; 428/311.71; 428/530; 428/533; 428/534; 428/535; 162/164.1; 162/164.5; 162/164.6; 162/168.3
(58) Field of Search .................. 524/555, 815; 428/311.71, 530, 533, 534, 535; 162/164.1, 164.5, 164.6, 168.3

(56) References Cited

U.S. PATENT DOCUMENTS

| 3,872,039 A | 3/1975 | Vaughn et al. |
| 4,392,917 A | 7/1983 | Lipowski et al. |
| 4,426,485 A | 1/1984 | Hoy et al. |
| 4,535,098 A | 8/1985 | Evani et al. |
| 4,599,390 A | 7/1986 | Fan et al. |
| 4,744,864 A | 5/1988 | Deets et al. |
| 4,801,387 A | 1/1989 | Chen |
| 4,835,206 A | 5/1989 | Farrar et al. |
| 4,835,234 A | 5/1989 | Valint et al. |
| 5,234,604 A | 8/1993 | Liao et al. |
| 5,252,692 A | 10/1993 | Lovy et al. |
| 5,368,744 A | 11/1994 | Wood et al. |
| 5,541,252 A | 7/1996 | Schmitt et al. |
| 5,980,878 A | 11/1999 | Torgerson et al. |

FOREIGN PATENT DOCUMENTS

| EP | 0 374 478 A3 | 6/1990 |
| FR | 2 377 447 | 8/1978 |
| GB | 1372787 | * 11/1974 |

* cited by examiner

*Primary Examiner*—James J. Seidleck
*Assistant Examiner*—Olga Asinovsky
(74) *Attorney, Agent, or Firm*—Gregory E. Croft

(57) ABSTRACT

Synthetic polymers having hydrogen bonding capability and one or more aliphatic hydrocarbon moieties are capable of providing two distinct properties to paper products, such as tissues, which properties heretofore have been imparted through the use of at least two different molecules. The backbone of these synthetic polymers is based on modified vinyl polymers, such as polyvinyl alcohol, polyacrylamides and polyacrylic acids.

46 Claims, No Drawings

SYNTHETIC POLYMERS HAVING HYDROGEN BONDING CAPABILITY AND CONTAINING ALIPHATIC HYDROCARBON MOIETIES

This application is a divisional application of U.S. Ser. No. 09/299,977 filed on Apr. 27, 1999, now U.S. Pat. No. 6,974,677 which claims priority from U.S. Ser. No. 60/117,167 filed on Jan. 25, 1999.

BACKGROUND OF THE INVENTION

In the manufacture of paper products, such as facial tissue, bath tissue, paper towels, dinner napkins and the like, a wide variety of product properties are imparted to the final product through the use of chemical additives. Examples of such additives include softeners, debonders, wet strength agents, dry strength agents, sizing agents, opacifiers and the like. In many instances, more than one chemical additive is added to the product at some point in the manufacturing process. Unfortunately, there are instances where certain chemical additives may not be compatible with each other or may be detrimental to the efficiency of the papermaking process, such as can be the case with the effect of wet end chemicals on the downstream efficiency of creping adhesives. Another limitation, which is associated with wet end chemical addition, is the limited availability of adequate bonding sites on the papermaking fibers to which the chemicals can attach themselves. Under such circumstances, more than one chemical functionality competes for the limited available bonding sites, oftentimes resulting in the insufficient retention of one or both chemicals on the fibers. For more complex chemical systems it may desirable to have two or more functional additives retained in a specified ratio and/or spatial arrangement relative to one another. Although the addition of chemicals in a pre-determined ratio is easily achieved, retention of these chemicals in a predictable ratio is difficult using wet end chemical addition because of site competition and other influencing factors. Another limitation of either wet end or topical chemical addition is the inability to predictably locate functional chemical moieties in proximity to each other on the fiber surface.

Therefore, there is a need for a means of applying more than one chemical functionality to a paper web that mitigates the limitations created by limited number of bonding sites and the unpredictable nature of chemical additive retention which limits the ability to retain functional groups in a specified ratio and/or spatial arrangement with respect to one another.

SUMMARY OF THE INVENTION

In certain instances, two or more chemical functionalities can be combined into a single molecule, such that the combined molecule imparts at least two distinct product properties to the final paper product that heretofore have been imparted through the use of two or more different molecules. More specifically, synthetic polymers, which are commonly used in the paper industry as dry strength resins, wet strength resins and retention aids, can be combined into a single molecule with modified aliphatic hydrocarbons, which are commonly utilized, in conjunction with cationic moieties, as softeners, debonders, lubricants and sizing agents. The resulting molecule is a synthetic polymer having hydrogen bonding capability and an aliphatic hydrocarbon moiety which can provide several potential benefits, depending on the specific combination employed, including: (a) strength aids that soften; (b) softeners that do not reduce strength; (c) wet strength with improved wet/dry strength ratio; (d) debonders with reduced linting and sloughing; (e) strength aids with controlled absorbency; and (g) retention aids that soften.

As used herein, "aliphatic hydrocarbon moieties" are functional groups derived from a broad group of organic compounds, including alkanes, alkenes, alkynes and cyclic aliphatic classifications. The aliphatic hydrocarbon moieties can be linear or branched, saturated or unsaturated, substituted or non-substituted.

The synthetic polymers as described herein, have a portion of their structure derived from the polymerization of ethylenically unsaturated compounds which contain pendant groups that can form hydrogen bonds, ionic bonds or covalent bonds with cellulose molecules in fibers, thereby increasing interfiber bonding. They include polyacrylamide, polyvinyl alcohol, polyacrylic acid, polymaleic anhydride, polymaleic acid, polyitaconic acid, cationic polyacrylamides, anionic polyacrylamides, and the like. The synthetic polymers as described herein may be water soluble, organic soluble or soluble in mixtures of water water miscible organic compounds. Preferably they are water-soluble or water dispersible but this is not a necessity of the invention. Also included within the definition are the salts of the above mentioned acidic polymers. Substances which can be combined with the acidic portion of the polymers to make the salts include the alkali metals such as K and Na usually added in form of their hydroxides, the aliphatic amines and alkanol amines, such salts and methods of preparing such salts being well known to those skilled in the art.

Depending upon the chemical and the desired impact on the paper sheet, the synthetic polymers of this invention may be applied to the paper web by any of the means known to those skilled in the art. Such means include wet end addition, spray addition on the wet web, as a creping chemical sprayed on the Yankee dryer, or as a post treatment addition, including spraying, printing or coating.

Hence in one aspect, the invention resides in a synthetic polymer having hydrogen bonding capability and containing one or more aliphatic hydrocarbon moieties, said synthetic polymer having the following structure:

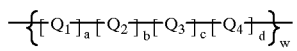

where:

a, b>0;

c,d≧0 such that c+d>0;

w≧1;

$Q_1$=a monomer unit or a block or graft copolymer containing a pendant group capable of forming hydrogen or covalent bonds with cellulose. Preferred pendant groups for hydrogen bonding are —$CONH_2$, —COOH, —COO⁻ M⁺, —OH and mixtures of said groups. Preferred pendant groups for covalent bonding are aldehydes and anhydrides. M⁺ can be any suitable counter ion including Na⁺, K⁺, Ca⁺² and the like.

$Q_2$=a monomer unit or a block or graft copolymer containing a $C_8$ or higher linear or branched, saturated or unsaturated, substituted or unsubstituted aliphatic hydrocarbon moiety. $Q_2$ may take the form of —$Z_1$—$Q_2$—$Z_1'$— where $Z_1$, $Z_1'$ are any bridging radicals, the same or different, whose purpose is to provide incorporation into the polymer backbone and $Q_2$ is as defined previously;

$Q_3$=a monomer unit or a block or graft copolymer containing a charge functionality. Such charge functionality is preferably cationic but may be anionic or amphoteric; and $Q_4$=a monomer unit or a block or graft copolymer containing a hydrophilic moiety, which is desirable for making the material into a form suitable for papermaking. $Q_4$ may take the form of —$Z_2$—$Q_4$—$Z_2'$— where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$.

It should be appreciated that when the $Q_3$ or other charged moiety is present in the synthetic polymer, that a suitable counterion will be necessary. Such counterions may or may not be represented in the formulas. Where such counterions are not represented in the formula it should be understood that such an ion will exist. The specific counterion is not critical for the invention, such counterion is only necessary for providing charge balance. For cationically charged groups the most common anions are those of the halides and alkyl sulfates. For anionically charged groups on the polymer the most common counter ions will be those of the alkali and alkaline earth metals as well as ammonia and amine derivatives.

More specifically, the invention resides in a synthetic polymer having the following structure:

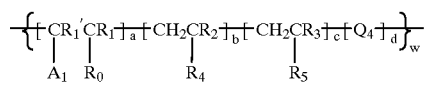

where:

$w \geq 1$;

$R_1, R_1', R_2, R_3$=H, $C_{1-4}$ alkyl;

a, b>0;

c,d$\geq$0 such that c+d>0;

$Q_4$=a monomer unit or a block or graft copolymer containing a hydrophilic moiety, which is desirable for making the material into a form suitable for papermaking. $Q_4$ may take the form of —$Z_2$—$Q_4$—$Z_2'$— where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$;

$R_0$=any group capable of forming hydrogen or covalent bonds with cellulose. Preferred are —$CONH_2$, —COOH, $COO^-M^+$, —OH, —CONHCHOHCHO and mixtures of said groups;

$A_1$=—H, —COOH;

$R_4$=Z—$R_6$—Y radical where:

Z=aryl, —$CH_2$—, —COO—, —CONR'—, —O—, —S—, —$OSO_2O$—, —CONHCO—, —CONHCHOHCHOO— or any other radical capable of bridging the $R_6$ group to the vinyl backbone portion of the molecule. (R'=H, alkyl);

$R_6$=any linear or branched, saturated or unsaturated, substituted or non-substituted aliphatic hydrocarbon;

Y=H, —$N^+R_7R_8R_9$, —$NR_7R_8$, where $R_7$, $R_8$, $R_9$ are same or different and are H or $C_{1-30}$ linear or branched, saturated or unsaturated aliphatic hydrocarbons;

At least one of $R_6$, $R_7$, $R_8$, $R_9$ must be an aliphatic, linear or branched, substituted or non-substituted, hydrocarbon of chain length 8 or higher;

$R_5=Z_2$—$R_{10}$—W;

$Z_2$=aryl, —$CH_2$—, —COO—, —CONH—, —O—, —S—, —$OSO_2O$—, any radical capable of bridging the $R_{10}$ group to the vinyl backbone portion of the molecule;

$R_{10}$=any linear or branched, aliphatic or aromatic hydrocarbon of 2 or more carbons, preferably —($CH_2CH_2$)—, —$C(CH_3)_2CH_2CH_2$—; and W=—$N^+R_{11},R_{12},R_{13}$ where $R_{11}$, $R_{12}$, $R_{13}$ is a $C_{1-4}$ alkyl group. —$[CH_2CR_3R_5]_c$— may also be the residue formed by co-polymerization with dimethyldiallyl ammonium chloride. In this case the charge-containing residue —$[CH_2CR_3R_5]_c$— will be the form of monomers with repeat units of structure:

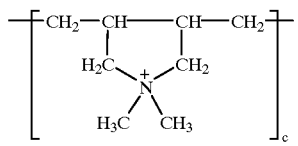

In another aspect, the invention resides in a paper sheet, such as a tissue sheet, comprising a synthetic polymer having hydrogen bonding capability and containing an aliphatic hydrocarbon moiety, said polymer having the following structure:

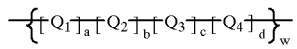

where:

a, b>0;

c,d$\geq$0;

$w \geq 1$;

$Q_1$=a monomer unit or a block or graft copolymer containing a pendant group capable of forming hydrogen or covalent bonds with cellulose. Preferred pendant groups for hydrogen bonding are —$CONH_2$, —COOH, —$COO^-$ $M^+$, —OH and mixtures of said groups. Preferred pendant groups for covalent bonding are aldehydes and anhydrides. $M^+$ can be any suitable counter ion including $Na^+$, $K^+$, $Ca^{+2}$ and the like;

$Q_2$=a monomer unit or a block or graft copolymer containing a $C_8$ or higher linear or branched, saturated or unsaturated, substituted or unsubstituted aliphatic hydrocarbon moiety. $Q_2$ may take the form of —$Z_1$—$Q_2$—$Z_1'$ where $Z_1$, $Z_1'$ are any bridging radicals, the same or different, whose purpose is to provide incorporation into the polymer backbone and $Q_2$ is as defined previously;

$Q_3$=a monomer unit or a block or graft copolymer containing a charge functionality. Such charge functionality is preferably cationic but may be anionic or amphoteric; and $Q_4$=a monomer unit or a block or graft copolymer containing hydrophilic moiety, which is desirable for making the material into a form suitable for papermaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$.

More specifically, the invention resides in a paper sheet, such as a tissue sheet, comprising a synthetic polymer having hydrogen bonding capability and containing an aliphatic hydrocarbon moiety, said polymer having the following structure:

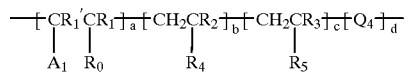

where:

$w \geq 1$;

$R_1, R_1', R_2, R_3$=H, $C_{1-4}$ alkyl;

a, b>0;

c, d >, =0;

$Q_4$=a monomer unit or a block or graft copolymer containing a hydrophilic moiety, which is desirable for making the material into a form suitable for papermaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, $x \geq 2$, $y \geq 1$ and $R_3$ is any suitable terminal group including —$CH_3$, —H, —$C_2H_5$, —$NH_2$;

$R_0$=any group capable of forming hydrogen or covalent bonds with cellulose. Preferred are —$CONH_2$, —COOH, $COO^-M^+$, —OH, —CONHCHOHCHO, and anhydride including mixtures of said groups;

$A_1$=H, COOH;

$R_4$=Z—$R_6$—Y radical where:

Z=aryl, —$CH_2$—, —COO—, —CONR'—, —O—, —S—, —$OSO_2O$—, —CONHCO—, —CONHCHOHCHOO—or any radical capable of bridging the $R_6$ group to the vinyl backbone portion of the molecule. (R'=—H, alkyl);

$R_6$=any aliphatic, linear or branched, saturated or unsaturated, substituted or non-substituted hydrocarbon;

Y=—H, —$N^+R_7R_8R_9$, —$NR_7R_8$, where $R_7$, $R_8$, $R_9$ are same or different and are H or $C_{1-30}$ linear or branched, saturated or unsaturated aliphatic hydrocarbons;

At least one of $R_6$, $R_7$, $R_8$, $R_9$ must be an aliphatic, linear or branched, substituted or non-substituted, hydrocarbon of chain length 8 or higher;

$R_5$=$Z_2$—$R_{10}$—W;

$Z_2$=aryl, —$CH_2$, —COO—, —CONH—, —O—, —S—, —$OSO_2O$— or any radical capable of bridging the $R_{10}$ group to the vinyl backbone portion of the molecule;

$R_{10}$=any linear or branched, aliphatic or aromatic hydrocarbon of 2 or more carbons, preferably —$(CH_2CH_2)$—, —$C(CH_3)_2CH_2CH_2$—; and W=—$N^+R_{11},R_{12},R_{13}$ where $R_{11}$, $R_{12}$, $R_{13}$ is a $C_{1-4}$ alkyl group.

—$[CH_2CR_3R_5]_c$— may also be the residue formed by co-polymerization with dimethyldiallyl ammonium chloride. In this case the charge-containing residue —$[CH_2CR_3R_5]_c$— will be the form of monomers with repeat units of structure:

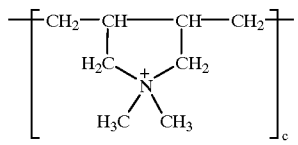

In another aspect, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

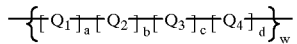

where:

a, b>0;

c,d $\geq 0$;

$w \geq 1$;

$Q_1$=a monomer unit or a block or graft copolymer containing a pendant group capable of forming hydrogen or covalent bonds with cellulose. Preferred pendant groups for hydrogen bonding are —$CONH_2$, —COOH, $COO^{-+}M$, —OH and mixtures of said groups. Preferred pendant groups for covalent bonding are aldehydes and anhydrides. M+ can be any suitable counter ion including $Na^+$, $K^+$, $Ca^{+2}$ and the like;

$Q_2$=a monomer unit or a block or graft copolymer containing a $C_8$ or higher linear or branched, saturated or unsaturated, substituted or unsubstituted aliphatic hydrocarbon moiety. $Q_2$ may take the form of —$Z_1$—$Q_2$—$Z_1$'— where $Z_1$, $Z_1$' are any bridging radicals, the same or different, whose purpose is to provide incorporation into the polymer backbone and $Q_2$ is as defined previously;

$Q_3$=a monomer unit or a block or graft copolymer containing a charge functionality. Such charge functionality is preferably cationic but may be anionic or amphoteric; and $Q_4$=a monomer unit or a block or graft copolymer containing a hydrophilic moiety, which is desirable for making the material into a form suitable for papermaking. $Q_4$ may take the form of $-Z_2-Q_4-Z_2'-$ where $Z_2, Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula $-[(CR_1R_2)_xO]_y-R_3$, wherein $R_1, R_2$ is $-H$ or $-CH_3$, $x \geq 2$, $y \geq 1$ and $R_3$ is any suitable terminal group including $-CH_3$, $-H$, $-C_2H_5$, $-NH_2$.

More specifically, the invention resides in a method of making a paper sheet, such as a tissue sheet, comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymeric additive is added to the aqueous suspension of fibers or to the web, said polymeric additive having the following structure:

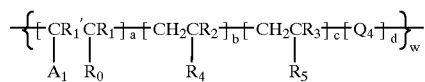

where:

$w \geq 1$;

$R_1 R_1', R_2, R_3 = H, C_{1-4}$ alkyl;

a, b > 0;

c, d $\geq 0$;

$Q_4$ = a monomer unit or a block or graft copolymer containing a hydrophilic moiety, which is desirable for making the material into a form suitable for papermaking. $Q_4$ may take the form of $-Z_2-Q_4-Z_2'-$ where $Z_2, Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula $-[(CR_1R_2)_xO]_y-R_3$, wherein $R_1, R_2$ is H or $CH_3$, $x \geq 2$, $y \geq 1$ and $R_3$ is any suitable terminal group including $-CH_3$, $-H$, $-C_2H_5$, $-NH_2$;

$R_0$ = any group capable of forming hydrogen or covalent bonds with cellulose. Preferred are $-CONH_2$, COOH, $COO^-$, $-OH$, CONHCHOHCHO, and anhydride including mixtures of said groups;

$A_1 = -H, -COOH$;

$R_4 = Z-R_6-Y$ radical where:

Z=aryl, $-CH_2-$, $-COO-$, $-CONR'-$, $-O-$, $-S-$, $-OSO_2O-$, $-CONHCO-$, $-CONHCHOHCHOO-$ or any radical capable of bridging the $R_6$ group to the vinyl backbone portion of the molecule. (R'=H, alkyl);

$R_6$ = any aliphatic, linear or branched, saturated or unsatured, substituted or non-substituted hydrocarbon;

Y=H, $-N^+R_{11},R_{12},R_{13}$, $-NR_7R_8$, where $R_7, R_8, R_9$ are same or different and are H or $C_{1-30}$ linear or branched, saturated or unsaturated aliphatic hydrocarbons;

At least one of $R_6, R_7, R_8, R_9$ must be an aliphatic, linear or branched, substituted or non-substituted, hydrocarbon of chain length 8 or higher;

$R_5 = Z_2 - R_{10} - W$;

$Z_2$=aryl, $-CH_2-$, $-COO-$, $-CONH-$, $-O-$, $-S-$, $-OSO_2O-$ or any radical capable of bridging the $R_{10}$ group to the vinyl backbone portion of the molecule;

$R_{10}$=any linear or branched, aliphatic or aromatic hydrocarbon of 2 or more carbons, preferably $-(CH_2CH_2)-$, $-C(CH_3)_2CH_2CH_2-$; and $W = -N^+R_{11},R_{12},R_{13}$ where $R_{11}, R_{12}, R_{13}$ is a $C_{1-4}$ alkyl group.

$-[CH_2CR_3R_5]_c-$ may also be the residue formed by co-polymerization with dimethyldiallyl ammonium chloride. In this case the charge-containing residue $-[CH_2CR_3R_5]_c-$ will be the form of monomers with repeat units of structure:

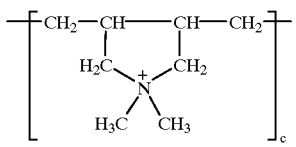

The amount of the synthetic polymeric additive added to the fibers or the tissue web can be from about 0.02 to about 4 weight percent, on a dry fiber basis, more specifically from about 0.05 to about 2 weight percent, and still more specifically from about 0.1 to about 1 weight percent. The synthetic polymer can be added to the fibers or web at any point in the process, but it can be particularly advantageous to add the synthetic polymer to the fibers while the fibers are suspended in water.

DETAILED DESCRIPTION OF THE INVENTION

To further describe the invention, examples of the synthesis of some of the various chemical species are given below.

First with regard to the synthetic polymers, they can be made via free radical polymerization of vinyl monomers of the form:

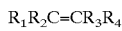

where $R_1, R_2, R_3, R_4$ may be H, halogen, alkyl, functional alkyl, aryl, functional aryl. For papermaking the polyacrylamides ($R_4=-CONH_2$), polyvinyl alcohols ($R_4=-OH$), and polyacrylates ($R_4=-COOR'$, R'=H, Me) are the most widely used.

Of the modified vinyl synthetic polymers, polyacrylamides (PAMs) are used as dry strength additives in addition to their widespread use as drainage and retention aids. They are water-soluble polymers containing primary amide groups that can form hydrogen bonds with cellulose molecules in fibers thereby increasing interfiber bonding. They are synthesized by the free radical polymerization of acrylamide as shown in FIG. 1.

Figure 1

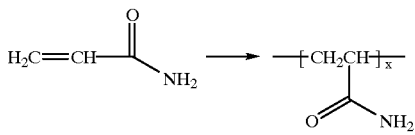

(PAMs) per se are nonionic materials and have very little attraction to papermaking fibers. Therefore it is necessary to incorporate charged groups into the polymer structure to make it useful for papermaking. Both anionic and cationic polyacrylamides are known in the art.

Anionic polyacrylamides can be produced by (1) the copolymerization of acrylamide with acrylic acid or the (2) hydrolysis of some of the amide groups on the polyacrylamide chain. The resultant polymer will contain a mixture of acrylamide and acrylic acid groups. Anionic polyacrylamides were first produced in the 1950's via copolymerization of acrylamide with acrylic acid. The acrylic acid groups introduce an ionizable carboxyl group on the polymer backbone. Ionization of these carboxyl groups is highly pH dependent, where above pH 7 essentially 100% of the carboxyl groups are ionized. Since anionic polyacrylamides are negatively charged they are not directly attracted to the like-charged cellulose papermaking fibers. A cationic substance such as alum must be used in conjunction with them to promote their retention.

To avoid the need for a cationic promoter, another approach is to incorporate cationic groups directly into the polymer backbone. Having been commercially produced since the late 1960's, these cationically charged polyacrylamides are the most common form of dry strength PAM's. Cationic polyacrylamides are produced by copolymerization of acrylamide with cationic monomers or by modification of some of the amide groups. Typical cationic monomers include: (1) methacryloyloxyethyl trimethyl ammonium methosulfate (METAMS); (2) dimethyldiallyl ammonium chloride (DMDAAC); (3) 3-acryloamido-3-methyl butyl trimethyl ammonium chloride (AMBTAC); (4) trimethylamino methacrylate; and (5) vinyl benzyl trimethyl ammonium chloride (VBTAC). A typical reaction for co-polymerization with METAMS is illustrated in FIG. 2.

Figure 2

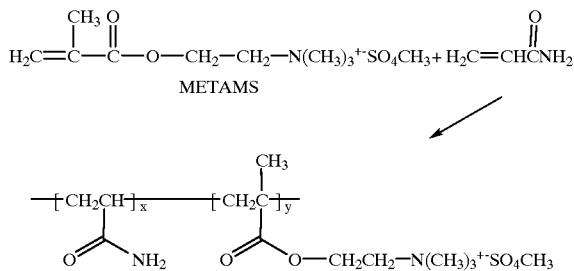

Production of cationic polyacrylamides by the modification of the amide groups of PAMs is most often accomplished via the Mannich reaction as illustrated in FIG. 3. Generally cationic polyacrylamides synthesized in this manner will contain from about 5 to about 70 mole percent cationic groups.

Figure 3

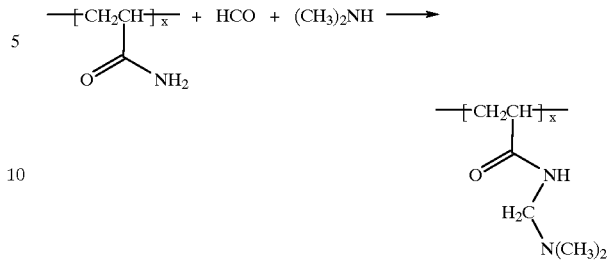

Generally dry strength PAMs are supplied as ready to use aqueous solutions or as water-soluble powders which must be dissolved prior to use. They may be added to thin or thick stock at a point of good mixing for best results. Addition rates of 0.1% to 0.5% of dry fiber typically give best results. High addition rates may cause over-cationization of the furnish and reduce the effectiveness of other additives.

When used as dry strength additives usually around 10 mole % of the monomers will contain charged groups. Unlike the anionic PAMs, cationic PAMs can be effectively charged across the entire pH range. Typical molecular weights (Mw) for cationic PAM dry strength aids are in the range of 100,000 to 500,000. The molecular weight is important so as to be low enough to not bridge between particles and cause flocculation, and yet high enough to retard migration of the polymer into the pores of the fibers. Such migration would cause a reduction in dry strength activity.

When used as retention aids a broader range of molecular weights and charge densities may be employed. Key characteristics of polyacrylamide retention aids include the molecular weight, the type of charge, the charge density and the delivery form. For the average molecular weight, the range can be: low (1,000–100,000); medium (100,000–1,000,000); high (1,000,000–5,000,000); very high (>5,000,000). The charge type can be nonionic, cationic, anionic or amphoteric. The charge density can be: low (1–10%); medium (10–40%); high (40–80%); or very high (80–100%). The delivery form can be an emulsion, an aqueous solution or a dry solid.

High molecular weight/low charge density flocculants are used most often for retention of fine particles in high shear and turbulence environments. Low Mw, high charge density products are used for their charge modifying capabilities and for retention in low shear environments.

There are several envisioned pathways in which synthetic polymers containing hydrogen bonding groups and aliphatic hydrocarbons can be combined onto a single molecule for purposes of this invention. These include, but are not limited to: (1) block co-polymerization and/or grafting; (2) direct monomer incorporation ; and (3) derivatization of functional groups on the polymer backbone. Each of these methods is described below. Since these materials maintain their bonding and/or charge characteristics they would be expected to maintain their dry strength and or retention capabilities as well as provide for materials with enhanced tactile properties due to introduction of the aliphatic hydrocarbon moieties.

The molar and weight ratios of the various functional groups on the polymer will largely depend on the specific application of the material and is not a critical aspect of the invention. However, the portion of the synthetic polymer [$Q_1$] capable of forming hydrogen, covalent and ionic bonds can constitute from about 10 to about 90 weight percent of the total polymer, more specifically from about 20 to about 80 weight percent of the total polymer and still more specifically from about 30 to about 70 weight percent of the total polymer. The aliphatic hydrocarbon portion [$Q_2$] of the synthetic polymer can constitute from about 10 to about 90 weight percent of the synthetic polymer, more specifically from about 20 to about 80 weight percent of the synthetic polymer and still more specifically from about 30 to about 70 weight percent of the synthetic polymer. The charge containing portion [$Q_3$] of the synthetic polymer can be comprised of monomer units constituting from 0 to about 80 mole percent of the total monomer units in the synthetic polymer, more specifically from 0 to about 30 mole percent and still more specifically from about 5 to about 15 mole percent. The [$Q_4$] functionality will be comprised of monomer units constituting from 0 to about 80 mole percent of the total monomer units in the synthetic polymer, more specifically from 0 to about 40 mole percent and still more specifically from 0 to about 20 mole percent.

Likewise the molecular weight of the synthetic polymers of the present invention will largely depend on the specific application of the material and is not overly critical to the invention. The weight average molecular weight range can be from about 1,000 to :about 5,000,000, more specifically from about 10,000 to about 2,000,000 and still more specifically from about 20,000 to about 1,000,000. Where these polymers are added for dry strength it is important that the molecular weight of the polymer be low enough so as to not bridge between particles and cause flocculation, and yet high enough so as to retard migration of the polymer into the pores of the fibers. These materials can have weight average molecular weights in the range of from about 5,000 to about 1,000,000, more specifically from about 10,000 to about 1,000,000 and still more specifically from about 20,000 to about 600,000.

Block Copolymerization and/or Grafting

In this aspect of the invention one or more of the [$Q$]$_i$ elements of the polymer exists as a block or graft copolymer on the vinyl backbone. For example, if the aliphatic hydrocarbon portion of the modified vinyl polymer was incorporated in such a manner, the aliphatic hydrocarbon portion would exist as a block copolymer of polyethylene, polypropylene, isobutylene, polytetraflouroethylene, or any other linear or branched, saturated or unsaturated, substituted or non-substituted hydrocarbon, such co-polymer incorporated either as block or graft onto the vinyl backbone. Generally the aliphatic hydrocarbon blocks would be built as a result of the free radical polymerization of the corresponding ethylenically unsaturated monomers including, ethylene, propylene, perflouroethylene, isobutylene and the like including mixtures of said monomers. These synthetic polymers are distinguished from those of the direct monomer incorporation in that the aliphatic hydrocarbon portion of the molecule would be incorporated linearly within the polymer chain rather than in a pendant fashion. Although the above example and the example in FIG. 4 are specific to the aliphatic hydrocarbon moiety incorporated via this approach it should be appreciated that any of the synthetic polymer elements or combination of the synthetic polymer elements $Q_1$, $Q_2$, $Q_3$, $Q_4$ could be incorporated via this approach. Note that where a polyacrylamide is employed that these polymers maintain pendant amide functionality and are therefore capable of being glyoxylated to form materials possessing temporary wet strength. A general example of preparing such a material is shown in FIG. 4.

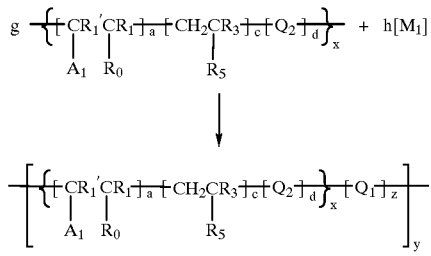

Figure 4 where:

$R_1$, $R_3$, $R_1'$=H, $C_{1-4}$ alkyl g, h, x≧1 x*y=g b*y=h a, b>0 c,d≧0

$R_0$=any group capable of forming hydrogen or covalent bonds with cellulose. Preferred are —$CONH_2$, COOH, COO$^-$, —OH, CONHCHOHCHO, and anhydride including mixtures of said groups;

$A_1$=H, COOH $M_1$=an unsaturated vinyl monomer unit capable of being polymerized into a polymer containing a $C_8$ or higher linear or branched, saturated or unsaturated, substituted or unsubstituted aliphatic hydrocarbon moiety. Alternatively $M_1$ could be an oligomer or polymer of such an unsaturated vinyl monomer.

$Q_2$=a block copolymer which is or contains a $C_8$ or higher linear or branched, saturated or unsaturated, substituted or unsubstituted aliphatic hydrocarbon moiety.

$Q_4$=a monomer unit or a block or graft copolymer containing a hydrophilic moiety, which is desirable for making the material into a form suitable for papermaking. $Q_4$ may take the form of —$Z_2$—$Q_4$—$Z_2'$— where $Z_2$, $Z_2'$ are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —[($CR_1R_2$)$_x$O]$_y$—$R_3$, wherein $R_1$, $R_2$ is H or $CH_3$, x≧2, y≧1 and $R_3$ is any suitable terminal group including —$CH_3$, —H, —$C_2H_5$, —$NH_2$ $R_5$=$Z_2$—$R_{10}$—W $Z_2$=Aryl, $CH_2$, COO—, CONH—, —O—, —S—, —$OSO_2O$—, any radical capable of bridging the $R_{10}$ group to the vinyl backbone portion of the molecule.

$R_{10}$=any linear or branched, aliphatic or aromatic hydrocarbon of 2or more carbons, preferably —($CH_2CH_2$)—, —$C(CH_3)_2CH_2CH_2$—

W=—$N^+R_{11}$,$R_{12}$,$R_{13}$, $NR_{11}R_{12}$, where $R_{11}$, $R_{12}$, $R_{13}$ is a $C_{1-4}$ alkyl group.

$R_5$ may also be the residue formed by co-polymerization with dimethyldiallyl ammonium chloride. In this case the residue will be the form of monomers with repeat units of structure:

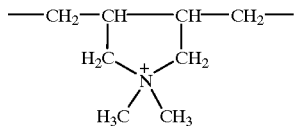

Direct Monomer Incorporation

Incorporation of the aliphatic moieties can be accomplished via copolymerization with vinyl type monomers containing aliphatic groups. Almost any vinyl type monomer containing a pendant aliphatic hydrocarbon can be co-polymerized with acrylamide or a similar vinyl monomer containing a pendant hydrogen-bonding moiety to be incorporated into the polymer backbone. Generically the synthesis can be described in FIG. 5.

Figure 5

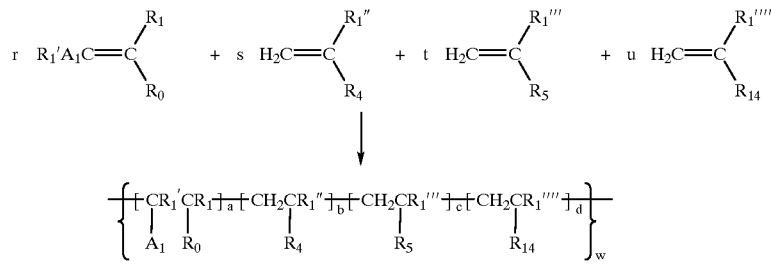

where:

$R_1$, $R_1'$, $R_1'''$, $R_1''''$=H, $C_{1-4}$ alkyl;

$a, b \geq 1$;

$c, d \geq 0$;

$w \geq 1$;

$r, s \geq 1$;

$t, u \geq 0$;

$a*w=r$;

$b*w=s$;

$c*w=t$;

$d*w=u$;

$R_0$=any group capable of forming hydrogen or covalent bonds with cellulose. Preferred are —$CONH_2$, $COOH$, $COO^-$, —OH, $CONHCHOHCHO$, and anhydride including mixtures of said groups;

$A_1$=H, COOH;

$R_4$=Z—$R_6$—Y radical where:

Z=Aryl, $CH_2$, COO—, CONH—, —O—, —S—, —$OSO_2O$—, —CONHCO—, CONHCHOHCHOO—, any radical capable of bridging the $R_6$ group to the vinyl backbone portion of the molecule;

Y=H, —N+$R_7R_8R_9$, —$NR_7R_8$, where $R_7$, $R_8$, $R_9$ are same or different and are H or $C_{1-30}$ aliphatic hydrocarbons;

$R_5$=any aliphatic, linear or branched, saturated or unsaturated, substituted or non-substituted hydrocarbon;

$R_{14}$=a moiety necessary for making the material into a form suitable for papermaking. $R_{14}$ may take the form of —$Z_1$—$R_{14}$ where $Z_1$ is any bridging radical whose purpose is to provide incorporation into the polymer backbone and $R_{14}$ is as defined previously. $R_{14}$ may be incorporated to offset the increased polymer hydrophobicity caused by introduction of the aliphatic hydrocarbon moieties. Examples of suitable $R_{14}$ moieties are (but is not limited to) the aliphatic polyether derivatives of the formula —$[(CR_1R_2)_xO]_y$—$R_{15}$, wherein $R_1$, $R_2$ is H or $CH_3$, $x \geq 2$, $y \geq 1$ and $R_{15}$ is any suitable terminal group including —$CH_3$, —H, —$C_2H_5$, —$NH_2$, and the like; and At least one of $R_6$, $R_7$, $R_8$, $R_9$ must be a $C_8$ or higher linear or branched, saturated or unsaturated, substituted or non-substituted, aliphatic hydrocarbon.

More specifically, $R_5=Z_2$—$R_{10}$—W, where:

$Z_2$=Aryl, $CH_2$, COO—, CONH—, —O—, —S—, —$OSO_2O$—, any radical capable of bridging the $R_{10}$ group to the vinyl backbone portion of the molecule;

$R_{10}$=any linear or branched, aliphatic or aromatic hydrocarbon of 2 or more carbons, preferably —($CH_2CH_2$)—, —$C(CH_3)_2CH_2CH_2$—; and W=—$N^+R_{11},R_{12},R_{13}$ where $R_{11}$, $R_{12}$, $R_{13}$ is a $C_{1-4}$ alkyl group. $R_5$ can also be the residue formed by co-polymerization with dimethyldiallyl ammonium chloride. In this case the residue will be the form of monomers with repeat units of structure:

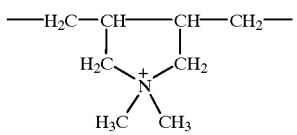

A specific example of the synthesis is shown in FIG. 6.

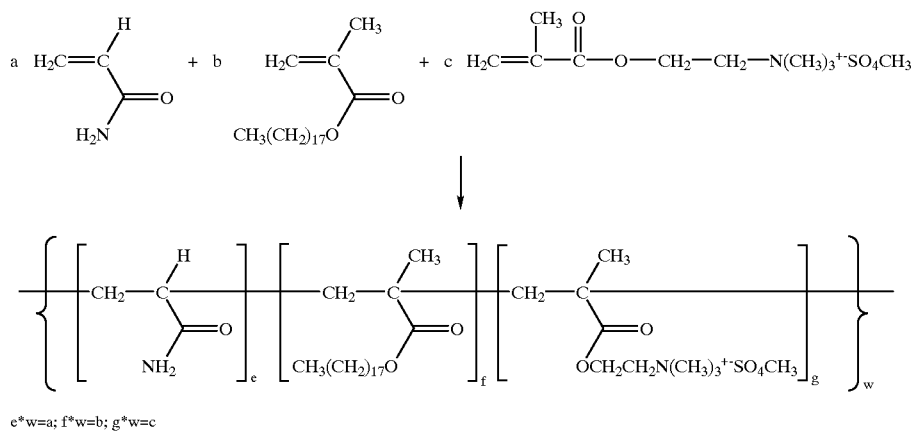

Figure 6 e*w=a; f*w=b; g*w=c

Long chain acrylates, including octadecyl acrylate, octadecyl methacrylate, 2-ethylhexyl acrylate, 2-ethylhexyl methacrylate, dodecyl acrylate, dodecyl methacrylate, tridecyl acrylate, tridecyl methacrylate, lauryl acrylate, lauryl methacrylate and the like including mixtures of said monomers are known commercially available materials and are all suitable for incorporation of the aliphatic hydrocarbon moiety.

Also known are various vinyl ethers dodecyl vinyl ether, tridecyl vinyl ether, tetradecyl vinyl ether, pentadecyl vinyl ether, hexadecyl vinyl ether, and esters such as those derived from aliphatic alcohols and $\alpha,\beta$-ethylenic unsaturated carboxylic acids including vinyl neodecanoate, vinyl neononaoate, vinyl stearate, vinyl 2-ethylhexanoate, vinyl dodecanoate, vinyl tetradecanoate, vinyl hexadecanoate and the like including mixtures of said monomers, all of which are suitable for incorporation of the aliphatic hydrocarbon moiety.

Also suitable for incorporation of the aliphatic hydrocarbon moiety, but less preferred, are the $\alpha$-unsaturated and $\beta$-unsaturated olefinic hydrocarbon derivatives such as 1-octadecene, 1-dodecene, 1-hexadecene, 1-heptadecene, 1-tridecene, 1-undecene, 1-decene, 1-pentadecene, 1-tetradecene, 2-octadecene, 2-dodecene, 2-hexadecene, 2-heptadecene, 2-tridecene, 2-undecene, 2-decene, 2-pentadecene, 2-tetradecene, and the like including mixtures of said monomers. They can be incorporated into any vinyl type polymer such as polyacrylamide, polyvinyl alcohol, polyacrylic acid, polyvinyl acetate, polymethacrylic acid, polyitaconic, poly(maleic acid), poly(maleic anhydride), polyacrylonitrile and the like. For the purposes of papermaking, the polyacrylamides, polyvinyl alcohols and polyacrylic acids are most preferred. They would be incorporated directly into the polymer via copolymerization with the associated ethylenically unsaturated monomers including acrylamide, vinyl alcohol, acrylic acid, methacrylic acid, itaconic acid, maleic acid, acrylonitrile and the like including mixtures of said monomers during the polymerization process as described below. The description shown is specific for a polyacrylamide but is applicable to any vinyl type polymer. When incorporated in such a manner the long chain aliphatic groups are arranged on the polymer in a pendant fashion.

Suitable monomers for incorporating a charge functionality into the polymer include, but are not limited to methacryloyloxyethyl trimethyl ammonium methosulfate (METAMS); dimethyldiallyl ammonium chloride (DMDAAC); 3-acryloamido-3-methyl butyl trimethyl ammonium chloride (AMBTAC); trimethylamino methacrylate; vinyl benzyl trimethyl ammonium chloride (VBTAC), 3-allyloxy-2-hydroxy-1propane sulfonic acid sodium salt and the like including mixtures of said monomers.

Suitable monomers for incorporating a functionality for making the polymer into a form suitable for papermaking includes but is not limited to: ethylene glycol acrylate, ethylene glycol methacrylate, diethylene glycol acrylate, diethylene glycol methacrylate, 2-allyloxyethanol, 3-allyloxy-1,2-propanediol, poly(ethylene glycol) acrylate, poly(ethylene glycol) methacrylate, poly(ethylene glycol) diacrylate, poly(ethylene glycol) dimethacrylate, poly(ethylene glycol) methyl ether acrylate, poly(ethylene glycol) methyl ether methacrylate, poly(ethylene glycol) ethyl ether acrylate, poly(ethylene glycol) ethyl ether methacrylate, poly(ethylene glycol) divinyl ether, poly(ethylene glycol) phenyl ether acrylate, poly(propylene glycol) acrylate, poly(propyiene glycol) methacrylate, poly(propylene glycol) diacrylate, poly(propylene glycol) dimethacrylate, poly(propylene glycol) methyl ether acrylate, poly(propylene glycol) methyl ether methacrylate, poly(propylene glycol) ethyl ether acrylate, poly(propylene glycol) ethyl ether methacrylate, poly(propylene glycol) phenyl ether acrylate and the like including mixtures of said monomers.

Note that where acrylamide is employed that the resultant polymers contain pendant amide functionality that is capable of being glyoxylated to form materials possessing temporary wet strength as shown in FIGS. 7 and 8.

Figure 7

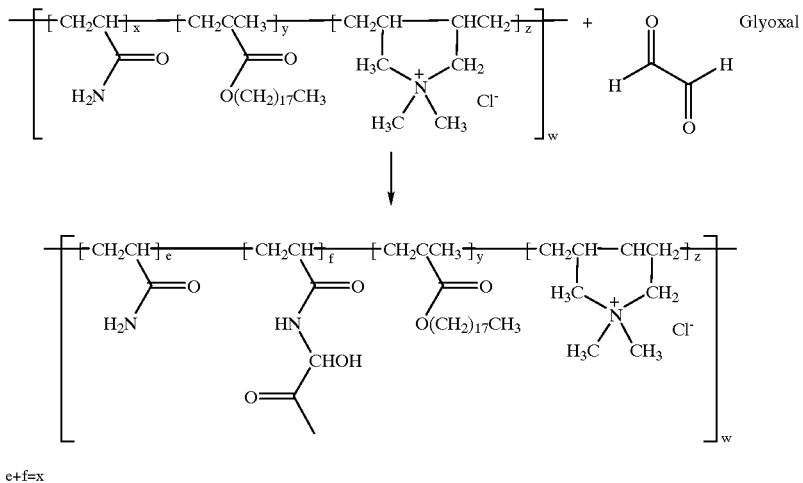

Figure 8

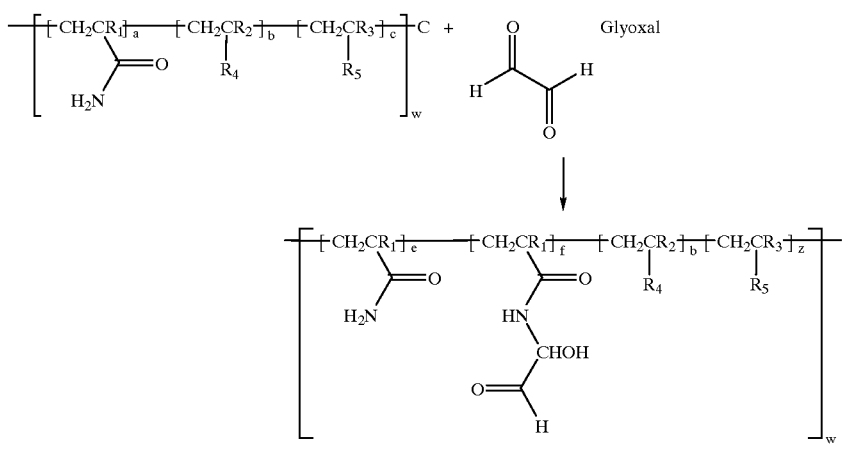

Where
w≥1;
$R_1$, $R_1'$, $R_2$, $R_3$=H, $C_{1-4}$ alkyl;
a, b>0;
c,d≥0;
$R_4$=Z—$R_6$—Y radical where:
   Z=Aryl, $CH_2$, COO—, CONR'—, —O—, —S—, —$OSO_2O$—, —CONHCO—, —CONHCHOHCHOO—, any radical capable of bridging the $R_6$ group to the vinyl backbone portion of the molecule. (R'=H, alkyl);
   $R_6$=any aliphatic, linear or branched, saturated or unsaturated, substituted or non-substituted hydrocarbon;
   Y=H, —N+$R_7R_8R_9$, —N$R_7R_8$, where $R_7$, $R_8$, $R_9$ are same or different and are H or $C_{1-30}$ linear or branched, saturated or unsaturated aliphatic hydrocarbons;

At least one of $R_6$, $R_7$, $R_8$, $R_9$ must be an aliphatic, linear or branched, substituted or non-substituted, hydrocarbon of chain length 8 or higher;
$R_5$=$Z_2$—$R_{10}$—X;
$Z_2$=Aryl, $CH_2$, COO—, CONH—, —O—, —S—, —$OSO_2O$—, any radical capable of bridging the $R_{10}$ group to the vinyl backbone portion of the molecule;
$R_{10}$=any linear or branched, aliphatic or aromatic hydrocarbon of 2 or more carbons, preferably —($CH_2CH_2$)—, —$C(CH_3)_2CH_2CH_2$—; and
X=—N+$R_{11},R_{12},R_{13}$ where $R_{11}$, $R_{12}$, $R_{13}$ is a $C_{1-4}$ alkyl group.

$R_5$ may also be the residue formed by co-polymerization with dimethyldiallyl ammonium chloride. In this case the residue will be the form of monomers with repeat units of structure:

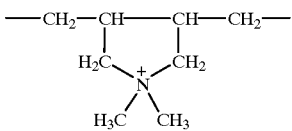

Derivatization of Functional Groups on the Polymer Backbone

The third approach to synthesis of materials of this invention is to modify the functional groups on the polymer backbone. The vinyl type polymers such as polyacrylamides, modified polyacrylamides, polyacrylic acids, polyvinyl alcohols, polymaleic acid, polymaleic anhydride and polyacrylonitriles contain functional groups which may be further derivatized to produce materials of the structure of FIG. 4. The polymer functional groups which may be reacted upon include but are not limited to: amide, carboxyl, hydroxyl, anhydride, cyano, thiol and aldehyde (from glyoxylation or similar reaction). In general the starting polymer will be one of that shown in FIG. 9.

Figure 9

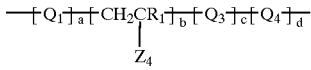

where:

$R_1$=H, $C_{1-4}$ alkyl;

a, b≧1;

c,d≧0;

$Q_1$=a monomer unit or a block or graft copolymer containing a pendant group capable of forming hydrogen or covalent bonds with cellulose. Preferred pendant groups for hydrogen bonding are —$CONH_2$, —$COO^-$ $_+M$, —OH and mixtures of said groups.

Preferred pendant groups for covalent bonding are aldehydes and anhydrides. M+ can be any suitable counter ion including $Na^+$, $K^+$, $Ca^{+2}$ and the like;

$Q_3$=a monomer unit or a block or graft copolymer containing a charge functionality. Such charge functionality is preferably cationic but may be anionic or amphoteric;

$Z_4$=—CONHCHOHCHO, —CHO, —$CONH_2$, —COOH, —CN, —OH, —SH, —$NH_2$, —R'OH, —R'CHO, —R'$CONH_2$, —R'COOH, —R'CN, —R'OH, —R'SH, —R'$NH_2$ or any other functional group capable of being reacted upon in a manner so as to incorporate a $C_8$ or higher linear or branched, saturated or unsaturated, substituted or unsubstituted aliphatic hydrocarbon into the polymer and R' can be any bridging radical, organic or inorganic whose purpose is to attach the functional group to the polymer; and $Q_4$=a monomer unit or a block or graft copolymer containing a hydrophilic moiety, which is desirable for making the material into a form suitable for papermaking. $Q_4$ may take the form of —$Z_2$—$Q_4$—$Z_2$'— where $Z_2$, $Z_2$'are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, x≧2, y≧2 and $R_3$ is any suitable terminal group including —$CH_3$, —H, —$C_2H_5$, —$NH_2$.

Such structures as those shown in FIG. 9 are amenable to reaction with a large variety of reagents as a means of incorporating aliphatic residues into the polymer. The general scheme for such syntheses is shown in FIG. 10.

Figure 10

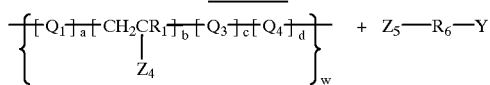

where:

$R_1$=H, $C_{1-4}$alkyl;

a, b≧1;

c,d≧0;

$Q_1$=a monomer unit or a block or graft copolymer containing a pendant group capable of forming hydrogen or covalent bonds with cellulose. Preferred pendant groups for hydrogen bonding are —$CONH_2$, —$COO^-$ $_+M$, —OH and mixtures of said groups. Preferred pendant groups for covalent bonding are aldehydes and anhydrides. M+ can be any suitable counter ion including $Na^+$, $K^+$, $Ca^{+2}$ and the like;

$Q_3$=a monomer unit or a block or graft copolymer containing a charge functionality. Such charge functionality is preferably cationic but may be anionic or amphoteric;

$Z_4$=—CONHCHOHCHO, —CHO, —$CONH_2$, —COOH, —CN, —OH, —SH, —$NH_2$, —R'OH, —R'CHO, —R'$CONH_2$, —R'COOH, —R'CN, —R'OH, —R'SH, —R'$NH_2$ or any other functional group capable of being reacted upon in a manner so as to incorporate a $C_8$ or higher linear or branched, saturated or unsaturated, substituted or unsubstituted aliphatic hydrocarbon into the polymer and R' can be any bridging radical, organic or inorganic whose purpose is to attach the functional group to the polymer; and $Q_4$=a monomer unit or a block or graft copolymer containing a hydrophilic moiety, which is desirable for making the material into a form suitable for papermaking. $Q_4$ may take the form of —$Z_2$—$Q_4$—$Z_2$'— where $Z_2$, $Z_2$' are any bridging radicals, the same or different, whose purpose is to provide incorporation into the polymer backbone and $Q_4$ is as defined previously. $Q_4$ may be incorporated to offset the increased polymer hydrophobicity caused by introduction of the aliphatic hydrocarbon moieties. Examples of suitable $Q_4$ moieties are (but is not limited to) the aliphatic polyether derivatives of the formula —$[(CR_1R_2)_xO]_y$—$R_3$, wherein $R_1$, $R_2$ is H or $CH_3$, x≧2, y≧2 and $R_3$ is any suitable terminal group including —$CH_3$, —H, —$C_2H_5$ —$NH_2$.

$Z_5$=HOOC—, ClOC—, HO—, HS—, —COOOC—, $H_2N$—, HCO—, $ClSO_2O$—, XOC— (X=halo), ClCOO—, or any other functional group capable of reaction with a $Z_4$ type functional group so as to attach the —$R_6$—Y residue onto the polymer;

$R_6$=any aliphatic, linear or branched, saturated or unsaturated, substituted or non- substituted hydrocarbon;

Y=H, —$N^+R_7R_8R_9$, —$NR_7R_8$, where $R_7$, $R_8$, $R_9$ are same or different and are H or $C_{1-30}$ linear or branched, saturated or unsaturated aliphatic hydrocarbons; and where at least one of $R_6$, $R_7$, $R_8$, $R_9$ must be a $C_8$ or higher linear or branched, substituted or non-substituted, aliphatic hydrocarbon.

Some specific examples of such reactions are given in FIGS. 11 and 12.

Figure 11

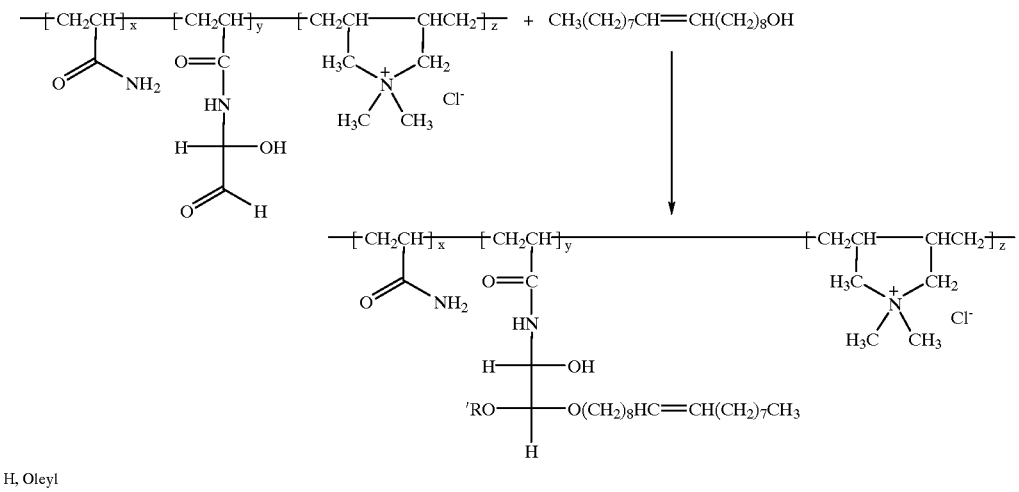

R' = H, Oleyl

Figure 12

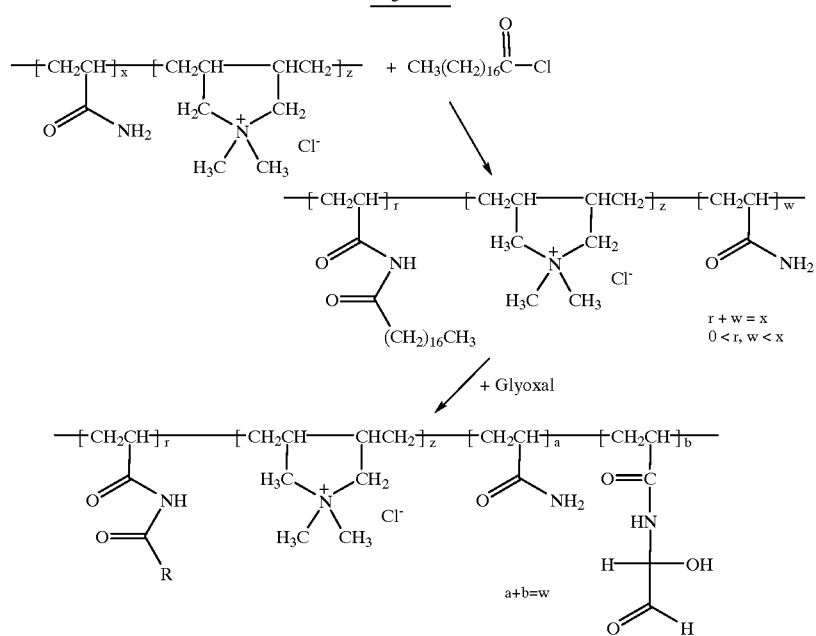

It will be appreciated that the foregoing examples, given for purposes of illustration, are not to be construed as limiting the scope of this invention, which is defined by the following claims and all equivalents thereto.

We claim:

1. A paper sheet comprising a synthetic polymer having hydrogen bonding capability and containing one or more aliphatic hydrocarbon moieties, said polymer having the following structure:

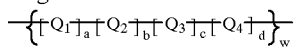

where:

a, b, d>0;

c≧0;

w≧1;

$Q_1$=a monomer unit or a block or graft copolymer containing a pendant group capable of forming hydrogen or covalent bonds with cellulose;

$Q_2$=a monomer unit or a block or graft copolymer containing a $C_8$ or higher linear or branched, saturated or unsaturated, substituted or unsubstituted aliphatic hydrocarbon moiety,-

$Q_3$=a monomer unit or a block or graft copolymer containing a charge functionality; and $Q_4$=a monomer unit or a block or graft copolymer containing a hydrophilic moiety, which is desirable for making the material into a form suitable for papermaking.

2. The paper sheet of claim 1 wherein the pendant group on $Q_1$ capable of forming hydrogen or covalent bonds is selected from the group consisting of —$CONH_2$, —COOH, —$COO^-M^+$, —OH, —CONHCHOHCHO and mixtures thereof, wherein M+ is a counter ion.

3. The paper sheet of claim 1 wherein $Q_2$ is of the form —$Z_1$—$Q_2$—$Z_1'$— where $Z_1, Z_1'$ are bridging radicals, which can be the same or different.

4. The paper sheet of claim 1 wherein $Q_4$ is of the form —$Z_2$—$Q_4$—$Z_2'$— where $Z_2, Z_2'$ are bridging radicals, which can be the same or different.

5. The paper sheet of claim 1 wherein $Q_4$ is a radical of the form —$CHR_1CR_{30}R_1'$— wherein $R_{30}$ is an aliphatic polyether derivative of the formula

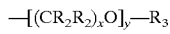

where:

$R_1, R_1'$ is —H, $C_{1-4}$ alkyl;

$R_2, R_2'$ is —H or —$CH_3$;

$x \geq 2$;

$y \geq 2$; and $R_3$ is a terminal group selected from the group consisting of —$CH_3$, —H, —$C_2H_5$, and —$NH_2$.

6. The paper sheet of claim 1 wherein $Q_3$ is

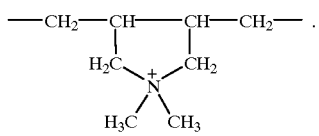

7. The paper sheet of claim 1 wherein $Q_3$ is a radical of the form

—$CHR_1CR_{20}R_1'$— wherein $R_{20}$=a pendant group of the form $Z_1$—$R_{10}$—W where $Z_1$ is a radical capable of bonding the $R_{10}$ group to the polymer;

$R_1$ and $R_1'$ are —H or a $C_{1-4}$ alkyl group;

$R_{10}$=any linear or branched, aliphatic or aromatic hydrocarbon of 2 or more carbons; and W=—$N+R_{11},R_{12},R_{13}$ where $R_{11}, R_{12}, R_{13}$ is a $C_{1-4}$ alkyl group.

8. The paper sheet of claim 7 wherein $Z_1$ is selected from the group consisting of aryl, —$CH_2$—, —COO—, —CONH—, —O—, —S—, and —$OSO_2O$—.

9. The paper sheet of claim 7 wherein $R_{10}$ is —($CH_2CH_2$)— or —$C(CH_3)_2CH_2CH_2$—.

10. The paper sheet of claim 1 wherein "c" is 0.

11. The paper sheet of claim 1 wherein the pendant group on $Q_1$ capable of forming hydrogen bonds is —$CONH_2$.

12. The paper sheet of claim 1 wherein the pendant group on $Q_1$ capable of forming covalent bonds is —CONHCHOHCHO.

13. The paper sheet of claim 1 wherein $Q_1$ has —$ONH_2$ and —CONHCHOHCHO pendant groups.

14. A paper sheet comprising a synthetic polymer having hydrogen bonding capability and containing one or more aliphatic hydrocarbon moieties, said polymer having the following structure:

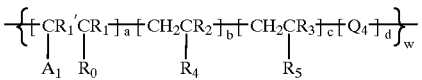

where:

$w \geq 1$;

$R_1, R_1', R_2, R_3$=H or $C_{1-4}$ alkyl;

a, b, d>0;

$c \geq 0$;

$R_0$=a group capable of forming hydrogen or covalent bonds with cellulose;

$Q_4$=a monomer unit or a block or graft copolymer containing a hydrophilic moiety;

$A_1$=—H, —COOH;

$R_4$=a $Z_1$—$R_6$—Y radical, where:

$Z_1$=any radical capable of bonding the $R_6$ group to the polymer;

$R_6$=any linear or branched, saturated or unsaturated, substituted or non-substituted aliphatic hydrocarbon;

Y=—H, —$N^+R_7R_8R_9$, or —$NR_7R_8$, where $R_7, R_8, R_9$ are same or different and are H or $C_{1-30}$ linear or branched, saturated or unsaturated aliphatic hydrocarbons and where:

at least one of $R_6, R_7, R_8, R_9$ must be a linear or branched, substituted or non-substituted, aliphatic hydrocarbon having a carbon chain length of 8 or higher;

$R_5=Z_1$—$R_{10}$—W, where:

$Z_1$=any radical capable of bonding the $R_{10}$ group to the polymer;

$R_{10}$=any linear or branched, aliphatic or aromatic hydrocarbon of 2 or more carbons; and W=—$N^+R_{11},R_{12},R_{13}$, where $R_{11}, R_{12}, R_{13}$ are $C_{1-4}$ alkyl groups.

15. The paper sheet of claim 14 wherein $R_0$ is selected from the group consisting of —$CONH_2$, —COOH, —$COO^-M^+$, —OH, —CONHCHOHCHO, and mixtures thereof, wherein $M^+$ is a counter ion.

16. The paper sheet of claim 14 wherein $Q_4$ is of the form —$Z_2$—$Q_4$—$Z_2'$— where $Z_2, Z_2'$ are bridging radicals, which can be the same or different.

17. The paper sheet of claim 14 wherein $Z_1$ is selected from the group consisting of aryl, —$CH_2$—, —COO—, —CONR'—, —O—, —S—, —$OSO_2O$—, —CONHCO—, and —CONHCHOHCHOO—, and where R' is H or $C_{1-4}$ alkyl.

18. The paper sheet of claim 14 wherein $Z_1$ is selected from the group consisting of aryl, —$CH_2$—, —COO—, —CONH—, —O—, —S—, and —$OSO_2O$—.

19. The paper sheet of claim 14 wherein $R_{10}$ is —($CH_2CH_2$)— or —$C(CH_3)_2CH_2CH_2$—.

20. The paper sheet of claim 14 wherein $A_1$ is —H and $R_0$ is —$CONH_2$.

21. The paper sheet of claim 14 wherein $A_1$ is —H and $R_0$ is —CONHCHOHCHO.

22. The paper sheet of claim 14 wherein $R_0$ consists of both —$CONH_2$ and —CONHCHOHCHO groups.

23. A paper sheet comprising a synthetic polymer having hydrogen bonding capability and containing one or more aliphatic hydrocarbon moieties, said polymer having the following structure:

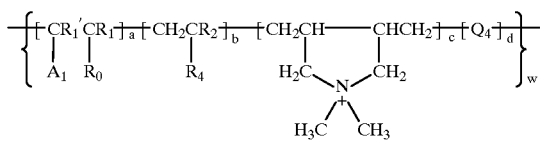

where:
w≧1;
$R_1, R_1', R_2, R_3$=H or $C_{1-4}$ alkyl;
a, b>0;
c,d≧0 such that c+d>0;
$R_0$=a group capable of forming hydrogen or covalent bonds with cellulose;
$Q_4$=a monomer unit or a block or graft copolymer containing a hydrophilic moiety;
$A_1$=—H, —COOH;
$R_4$=a $Z_1$—$R_6$—Y radical,
where:
  $Z_1$=any radical capable of bonding the $R_6$ group to the polymer;
  $R_6$=any linear or branched, saturated or unsaturated, substituted or non-substituted aliphatic hydrocarbon;
  Y=—H, —$N^+R_7R_8R_9$, or —$NR_7R_8$, where $R_7$, $R_8$, $R_9$ are same or different and are H or $C_{1-30}$ linear or branched, saturated or unsaturated aliphatic hydrocarbons and where:
    at least one of $R_6$, $R_7$, $R_8$, $R_9$ must be a linear or branched, substituted or non-substituted, aliphatic hydrocarbon having a carbon chain length of 8 or higher.

24. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

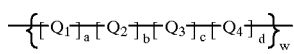

where:
a, b, d>0;
c≧0;
w≧1;
$Q_1$=a monomer unit or a block or graft copolymer containing a pendant group capable of forming hydrogen or covalent bonds with cellulose;
$Q_2$=a monomer unit or a block or graft copolymer containing a $C_8$ or higher linear or branched, saturated or unsaturated, substituted or unsubstituted aliphatic hydrocarbon moiety;
$Q_3$=a monomer unit or a block or graft copolymer containing a charge functionality; and
$Q_4$=a monomer unit or a block or graft copolymer containing a hydrophilic moiety, which is desirable for making the material into a form suitable for papermaking.

25. The method of claim 24 wherein the pendant group on $Q_1$ capable of forming hydrogen or covalent bonds is selected from the group consisting of —$CONH_2$, —COOH, —$COO^-M^+$, —OH, —CONHCHOHCHO and mixtures thereof, wherein M+ is a counter ion.

26. The method of claim 24 wherein $Q_2$ is of the form —$Z_1$—$Q_2$—$Z_1'$— where $Z_1$, $Z_1'$ are bridging radicals, which can be the same or different.

27. The method of claim 24 wherein $Q_4$ is of the form —$Z_2$—$Q_4$—$Z_2'$— where $Z_2$, $Z_2'$ are bridging radicals, which can be the same or different.

28. The method of claim 24 wherein $Q_4$ is a radical of the form —$CHR_1CR_{30}R_1'$— wherein $R_{30}$ is an aliphatic polyether derivative of the formula

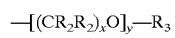

where:
$R_1$, $R_1'$ is —H, $C_{1-4}$ alkyl;
$R_2$, $R_2'$ is —H or —$CH_3$;
x≧2;
y≧2; and
$R_3$ is a terminal group selected from the group consisting of —$CH_3$, —H, —$C_2H_5$, and —$NH_2$.

29. The method of claim 24 wherein $Q_3$ is

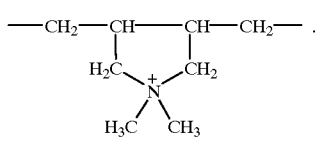

30. The method of claim 24 wherein $Q_3$ is a radical of the form —$CHR_1CR_{20}R_1'$— wherein
$R_{20}$=a pendant group of the form $Z_1$—$R_{10}$—W, where $Z_1$ is a radical capable of bonding the
$R_{10}$ group to the polymer;
$R_1$ and $R_1'$ are —H or a $C_{1-4}$ alkyl group;
$R_{10}$=any linear or branched, aliphatic or aromatic hydrocarbon of 2 or more carbons; and
W=—$N^+R_{11},R_{12},R_{13}$ where $R_{11}$, $R_{12}$, $R_{13}$ is a $C_{1-4}$ alkyl group.

31. The method of claim 30 wherein $Z_1$ is selected from the group consisting of aryl, —$CH_2$—, —COO—, —CONH—, —O—, —S—, and —$OSO_2O$—.

32. The method of claim 30 wherein $R_{10}$ is —($CH_2CH_2$)— or —$C(CH_3)_2CH_2CH_2$—.

33. The method of claim 24 wherein "c" is 0.

34. The method of claim 24 wherein the pendant group on $Q_1$ capable of forming hydrogen bonds is —$CONH_2$.

35. The method of claim 24 wherein the pendant group on $Q_1$ capable of forming covalent bonds is —CONHCHOHCHO.

36. The method of claim 24 wherein $Q_1$ has —$CONH_2$ and —CONHCHOHCHO pendant groups.

37. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

$$\left\{\left[CR_1'CR_1\right]_a\left[CH_2CR_2\right]_b\left[CH_2CR_3\right]_c\left[Q_4\right]_d\right\}_w$$
$$\phantom{xxxx}A_1\phantom{xx}R_0\phantom{xxxxx}R_4\phantom{xxxxxx}R_5$$

where:

$w \geq 1$;

$R_1, R_1', R_2, R_3 =$ H or $C_{1-4}$ alkyl;

a, b, d > 0;

$c \geq 0$;

$R_0 =$ a group capable of forming hydrogen or covalent bonds with cellulose;

$Q_4 =$ a monomer unit or a block or graft copolymer containing a hydrophilic moiety;

$A_1 =$ —H, —COOH;

$R_4 =$ a $Z_1$—$R_6$—Y radical, where:
- $Z_1 =$ any radical capable of bonding the $R_6$ group to the polymer;
- $R_6 =$ any linear or branched, saturated or unsaturated, substituted or non-substituted aliphatic hydrocarbon;
- Y= —H, —$N^+R_7R_8R_9$, or —$NR_7R_8$, where $R_7$, $R_8$, $R_9$ are same or different and are H or $C_{1-30}$ linear or branched, saturated or unsaturated aliphatic hydrocarbons and where:
  - at least one of $R_6$, $R_7$, $R_8$, $R_9$ must be a linear or branched, substituted or non-substituted, aliphatic hydrocarbon having a carbon chain length of 8 or higher;

$R_5 = Z_1$—$R_{10}$—W, where:
- $Z_1 =$ any radical capable of bonding the $R_{10}$ group to the polymer;
- $R_{10} =$ any linear or branched, aliphatic or aromatic hydrocarbon of 2 or more carbons; and
- W= —$N^+R_{11},R_{12},R_{13}$, where $R_{11}$, $R_{12}$, $R_{13}$ are $C_{1-4}$ alkyl groups.

38. The method of claim 37 wherein $R_0$ is selected from the group consisting of —$CONH_2$, —COOH, —$COO^-M^+$, —OH, —CONHCHOHCHO, and mixtures thereof, wherein $M^+$ is a counter ion.

39. The method of claim 37 wherein $Q_4$ is of the form —$Z_2$—$Q_4$—$Z_2'$— where $Z_2$, $Z_2'$ are bridging radicals, which can be the same or different.

40. The method of claim 37 wherein $Z_1$ is selected from the group consisting of aryl, —$CH_2$—, —COO—, —CONR'—, —O—, —S—, —$OSO_2O$—, —CONHCO—, and —CONHCHOHCHOO—, and where R' is H or $C_{1-4}$ alkyl.

41. The method of claim 37 wherein $Z_1$ is selected from the group consisting of aryl, —$CH_2$—, —COO—, —CONH—, —O—, —S—, and —$OSO_2O$—.

42. The method of claim 37 wherein $R_{10}$ is —($CH_2CH_2$)— or —$C(CH_3)_2CH_2CH_2$13.

43. The method of claim 37 wherein $A_1$ is —H and $R_0$ is —$CONH_2$.

44. The method of claim 37 wherein $A_1$ is —H and $R_0$ is —CONHCHOHCHO.

45. The method of claim 37 wherein $R_0$ consists of both —$CONH_2$ and —CONHCHOHCHO groups.

46. A method of making a paper sheet comprising the steps of: (a) forming an aqueous suspension of papermaking fibers; (b) depositing the aqueous suspension of papermaking fibers onto a forming fabric to form a web; and (c) dewatering and drying the web to form a paper sheet, wherein a synthetic polymer is added to the aqueous suspension of fibers and/or the web, said polymer having the following structure:

$$\left\{\left[CR_1'CR_1\right]_a\left[CH_2CR_2\right]_b\left[CH_2CH\text{---}CHCH_2\right]_c\left[Q_4\right]_d\right\}_w$$
with $H_2C$—$N^+(CH_3)(CH_3)$—$CH_2$ ring where:

$w \geq 1$;

$R_1, R_1', R_2, R_3 =$ H or $C_{1-4}$ alkyl;

a, b > 0;

$c, d \geq 0$ such that $c+d > 0$;

$R_0 =$ a group capable of forming hydrogen or covalent bonds with cellulose;

$Q_4 =$ a monomer unit or a block or graft copolymer containing a hydrophilic moiety;

$A_1 =$ —H, —COOH;

$R_4 =$ a $Z_1$—$R_6$—Y radical, where:
- $Z_1 =$ any radical capable of bonding the $R_6$ group to the polymer;
- $R_6 =$ any linear or branched, saturated or unsaturated, substituted or non-substituted aliphatic hydrocarbon;
- Y= —H, —$N^+R_7R_8R_9$, or —$NR_7R_8$, where $R_7$, $R_8$, $R_9$ are same or different and are H or $C_{1-30}$ linear or branched, saturated or unsaturated aliphatic hydrocarbons and where:
  - at least one of $R_6$, $R_7$, $R_8$, $R_9$ must be a linear or branched, substituted or non-substituted, aliphatic hydrocarbon having a carbon chain length of 8 or higher.

* * * * *

UNITED STATES PATENT AND TRADEMARK OFFICE
CERTIFICATE OF CORRECTION

| | | |
|---|---|---|
| PATENT NO. | : 6,365,667 B1 | Page 1 of 1 |
| DATED | : April 2, 2002 | |
| INVENTOR(S) | : Thomas Gerard Shannon, Daniel Arthur Clarahan, Mike Thomas Goulet and Wen Zyo Schroeder | |

It is certified that error appears in the above-identified patent and that said Letters Patent is hereby corrected as shown below:

Column 23,
Line 64, delete "$ONH_2$" and substitute -- $CONH_2$ --.

Column 28,
Line 2, delete "13".

Signed and Sealed this

Nineteenth Day of November, 2002

*Attest:*

JAMES E. ROGAN
*Attesting Officer*       *Director of the United States Patent and Trademark Office*